United States Patent [19]
Belton et al.

[11] Patent Number: 5,579,105
[45] Date of Patent: Nov. 26, 1996

[54] SPECTROMETERS

[75] Inventors: Peter S. Belton, Norwich; Kevin M. Wright, Eaton, both of England

[73] Assignee: British Technology Group Ltd., London, United Kingdom

[21] Appl. No.: 257,426

[22] Filed: Jun. 8, 1994

Related U.S. Application Data

[63] Continuation of Ser. No. 835,435, filed as PCT/GB91/01019, Jun. 24, 1991, abandoned.

[51] Int. Cl.$^6$ ..................................................... G01J 3/04
[52] U.S. Cl. ............................................. 356/310; 356/326
[58] Field of Search ......................... 356/310, 326–328, 356/330–334; 250/338.1, 339.1–339.08, 226

[56] References Cited

U.S. PATENT DOCUMENTS

| | | | |
|---|---|---|---|
| 3,985,441 | 10/1976 | Schoeffel et al. | 356/310 |
| 4,007,989 | 2/1977 | Wajda | 356/310 |
| 4,448,529 | 5/1984 | Krause | 356/310 |
| 4,766,379 | 8/1988 | Miyazaki et al. | 324/309 |

FOREIGN PATENT DOCUMENTS

| | | |
|---|---|---|
| 3413065 | 10/1984 | Germany . |
| 1033452 | 6/1966 | United Kingdom . |
| WO8600406 | 1/1986 | WIPO . |
| 8600406 | 1/1986 | WIPO . |

OTHER PUBLICATIONS

Harwit, "Spectrometric Imager", Applied Optics, vol. 10, #6, Jun. 1971.

A. G. Marshall in "Fourier, Hadamard and Hilbert Transforms in Chemistry", A. G. Marshall Ed., Plenum Press (1982) pp. 33–43.

F. Yates "Complex Experiments", J. Royal Statistical Society, May 1935, pp. 181–223.

M. Harwit, et al., "Hadamard Transform Optics", Academic Press, 1949, Chapters 1 and 3 and the Appendix, pp. 1–19, 44–95 and 200–228.

J. A. Decker, Jr., et al., "Experimental Operation of a Hadamard Spectrometer", Applied Optics, vol. 8, No. 12, Dec. 1969, pp. 2552–2554.

D. C. Tilotta, et al., "A Visible Near–infrared Hadamard Transfor Spectrometer Based on a Liquid Crystal Spatial Light Modulator Array: A New Approach in Spectrometry, Applied Spectroscopy", vol. 41, No. 5, 1987, pp. 727–734.

P. J. Treado et al, The Hadamard Transform, 266b Analytical Chemistry, vol. 61, No. 11, Jun. 1989, whole document.

J. A. Decker, Jr. et al, Experimental Operation of a Hadamard Spectrometer, Applied Optics, Vo. 8, No. 12, Dec. 1969.

*Primary Examiner*—K. Hantis
*Attorney, Agent, or Firm*—Cushman, Darby & Cushman

[57] ABSTRACT

A multi-sample spectrometer which finds particular application in such applications as on-line process control and monitoring, employs a Hadamard encoding scheme and comprises a source of radiation, a primary encoder to encode radiation from the source, a sample receiver to position the samples in the radiation path, a secondary encoder to modulate the intensity of radiation directed to individual samples, and a detector for receiving radiation from the samples.

27 Claims, 5 Drawing Sheets

SPECTROMETERS

This is a continuation of application Ser. No. 07/835,435, filed as PCT/Gb91/01019, Jun. 24, 1991, which was abandoned upon the filing hereof.

FIELD OF THE INVENTION

This invention relates to spectrometers and, in particular, to methods of multiplexing the signals received by spectrometers.

BACKGROUND OF THE INVENTION

In general, laboratory spectrometers receive signals from one radiation source and one sample, and display the results as a single spectrum of the sample.

In many applications for sensing and process control it is desirable to use a single costly spectrometer to analyze the signals from many sources and/or samples. The simplest way to do this is to present each signal sequentially to the spectrometer, and analyze the results separately. Alternatively, a multiplexing technique in which several signals are presented and analyzed at once may be used. Multiplexing has two advantages, the total signal arriving at the detector is greater than if the signals are observed sequentially and, for systems in which the noise is independent of the signal, the overall signal-to-noise ratio is increased relative to that which can be obtained by sequential sampling. The disadvantage is that it its necessary to determine the contribution of each source and sample to the total observed (composite) signal. This may be done by encoding the information carried by each signal in some appropriate way before recording the composite signal, and then using a suitable decoding process to recover the individual signals.

A variety of encoding and decoding schemes, which differ in their degree of difficulty of implementation, are possible. Typically the observations $Y_i$ which measure the total signal presented to the decoder (data-handling system) can be related to the unknown individual signals $X_j$ by a system of linear simultaneous equations which can be written in matrix form:

$$\begin{bmatrix} Y_1 \\ Y_2 \\ \cdot \\ \cdot \\ \cdot \\ Y_N \end{bmatrix} = \begin{bmatrix} A_{11} & A_{12} & \ldots & A_{1N} \\ A_{21} & A_{22} & \ldots & A_{2N} \\ \cdot & & & \\ \cdot & & & \\ \cdot & & & \\ A_{N1} & \ldots & \ldots & A_{NN} \end{bmatrix} \begin{bmatrix} X_1 \\ X_2 \\ \cdot \\ \cdot \\ \cdot \\ X_N \end{bmatrix} \quad (1)$$

The unknowns $X_j$ can be recovered by solving these equations.

The equation (1) presents a unifying framework for discussing the design of various kinds of spectrometers. The simplest case is that of a dispersive instrument, such as a conventional grating infra-red spectrometer or continuous wave NMR. The values $X_j$ are radiation intensities at various wavelengths, distinguished by a wavelength sorting device such as a diffraction grating. These intensities are recorded by the instrument and output in the form of a spectrum $Y_i$, i=1, 2, . . . , N. Thus, in this trivial case, the coefficients $A_{ij}$ comprise a unit matrix.

More complicated, and closely related, examples are provided by Fourier transform infra-red (FT-IR) and pulsed Fourier transform nuclear magnetic resonance (FT-NMR) spectrometers. In the former case, wavelength information (i.e. radiation intensities $X_j$ at various wavelengths) is encoded by a Michelson interferometer into a series of intensities $Y_i$ sorted as a function of the position of a movable mirror in one arm of the interferometer. In the NMR case the encoding is achieved, not by some physical device, but by the precession and progressive dephasing of the nuclear spins within the sample. Intensity values $X_j$ as a function of frequency are encoded and recorded as a series of induced voltages $Y_i$ measured at successive time intervals after the excitation of the sample.

In both of these cases, the matrix A is a unitary matrix of Fourier coefficients. Equation (1) can be solved by carrying out an inverse Fourier transform of the data $Y_i$.

An infinite number of other possible choices for the coefficients $A_{ij}$ can be envisaged. However, there are four important limitations on the possible choices:

1. It must be possible to solve equation (1). The basic requirement is that the determinant of A should be non-zero. In order to obtain accurate numerical solutions, it is also desirable that A should not be ill-conditioned.
2. It must be possible to realize the coefficients $A_{ij}$ physically in some way. The encoding process may be implemented explicitly in hardware (e.g. the Michelson interferometer), or it may be implicit in the physics of the system (e.g. nuclear precession). The hardware implementation is typically easier if the array is cyclic (i.e. each row is obtained by shifting the previous row one element to the left or right).
3. It is desirable that the experimental errors or signal-to-noise ratios of the decoded $X_j$ values should be at least as good as, or better than, the errors obtained when measuring the $X_j$ values directly by some other technique. Furthermore, the Improvement in signal-to-noise ratio should preferably be the same for all the $X_j$. This imposes a severe restriction on A.
4. It is desirable (though not essential) that the matrix A can be constructed and implemented for any order N. Changing N should not require radical redesign of the instrument.

We now consider points 2 and 3 above in more detail. Consider first a simple series of N measurements $X_j$ of some quantity, such as the individual weights of a group of objects. Suppose that the errors in these measurements have standard deviation $\sigma$, and that the weights of arbitrary collections of these objects can also be measured, also with error $\sigma$. It possible to determine the weights of the individual objects more accurately than $\sigma$ by weighing collections of the objects groups, rather than individually. The choice of objects in each group is made according to a suitable weighing scheme. Given N objects, N groups of these objects must be weighed according to a weighing scheme which may be represented by an N×N matrix of zeroes and ones. The presence of a one in the (i,j)th element indicates the inclusion of object j in the ith group, while a zero indicates its absence. In equation (1), the matrix A is the weighing scheme and the quantities $Y_i$ are the weights of the groups. For example, a suitable weighing scheme for 3 objects might look as follows:

$$A = \begin{bmatrix} 1 & 1 & 0 \\ 1 & 0 & 1 \\ 0 & 1 & 1 \end{bmatrix} \quad (2)$$

A matrix of zeroes and ones is appropriate to a type of measurement in which the individual measurements can be co-added into the group measurements, or omitted. In the weighing example, this is the situation when a spring balance is used: each object can be put on the pan, or not, as required.

If a beam balance is used, we have three options for each object: use the left-hand pan, the right-hand pan, or neither. The weighing scheme for this experiment requires a matrix of zeroes, ones and minus ones. This clearly illustrates that the nature of the experiment determines the possible values of the coefficients $A_{ij}$ which can be realized.

Considerable theoretical work has been carried out to find suitable matrices of the above types, which satisfy the above limitations. The conditions are very restrictive, and suitable matrices known only for certain values of N. Confining our attention to matrices of zeroes and ones, the best solutions are the so-called Hadamard simplex matrices, or S-matrices. The process of solving equation (1) is then an inverse Hadamard transform. Exactly one S-matrix (plus its cyclic permutations) exists for each N of the form N=4n−1, n=1, 2, 3, . . . (Note that requirement 4 above is not satisfied. How we proceed when N is not of this form will be dealt with below). Constructions for S-matrices of various orders satisfy requirement 3; the signal-to-noise ratio of each unknown $X_j$ (computed by inverse Hadamard transform) is improved by an enhancement factor $$E = \frac{(N+1)}{2\sqrt{N}} \approx \frac{\sqrt{N}}{2} \text{ for large } N \qquad (3)$$

relative to the signal-to-noise ratio of $X_j$ measured directly.

These principles have been used in the construction of Hadamard transform spectrometers (HTS). For example, Decker and Harwit (J. A. Decker, Jr., and M. Harwit, Appl. Opt., 8. (1969), p. 2552) constructed a multiplexing dispersive instrument using a multislit encoding mask at the exit focal plane of a conventional dispersive monochromator. This mask allowed more than one spectral resolution element (i.e. radiation at different wavelengths) to impinge upon the detector at once; hence, the encoding mask multiplexed the dispersed radiation. The pattern of slits in the mask modelled the pattern of zeroes and ones in one row of an S-matrix. The mask was physically moved to allow a different combination of spectral resolution elements to impinge on the detector before each detector reading was performed.

SUMMARY OF THE INVENTION

Previous applications of Hadamard transforms to spectroscopy have concentrated on obtaining multiplex and throughput advantages from spectrometers designed to look at one sample at a time. We have now developed a Hadamard encoding scheme for multi-sample spectrometers which can examine several samples at once, a capability which finds particular application in such applications as on-line process control and monitoring.

According to the present invention there is provided a spectrometer for the simultaneous examination of a plurality of samples comprising a source of radiation, primary encoding means to encode radiation from the source, sample receiving means to position the plurality of samples in the path of radiation from the source, secondary encoding means selectively to modulate the intensity of radiation directed to individual ones of the plurality of samples by a predetermined amount and detector means to detect radiation received from the plurality of samples.

Referring to equation (1). The quantities $Y_i$, $X_j$ are now no longer to be regarded as simple numbers, but instead become vectors, $\vec{Y}_i$, $\vec{X}_j$ in a space with an arbitrary number of dimensions P. The P components of each of these vectors are to be regarded as radiation intensities (or voltages, or any other kind of signal amplitude) measured at a series of P frequencies or times. Thus each vector represents a complete spectrum (or interferogram, free induction decay, or any other kind of signal trace). For purposes of illustration, the vectors will be regarded as FT-IR interferograms in what follows.

Composite interferograms $\vec{Y}_i$ are measured experimentally as additive combinations of some or all of the interferograms $\vec{X}_j$ contributed by individual samples. Thus the coefficients $A_{ij}$ are either zero or one in this simplest version of the technique. The co-adding of the $\vec{X}_j$ is a process of vector addition, e.g.

$$\vec{Y}_i = \sum_{j=1}^{N} A_{ij} \vec{X}_j \qquad (4)$$

in which the corresponding data in each component of the interferograms $\vec{X}_j$ are added to give one component of $\vec{Y}_i$. Each row of equation (1) represents a complete experiment in which signals from several samples are co-added to give a composite interferogram. Multiple scans may be performed in each experiment in order to improve signal-to-noise ratio by co-adding the scans (signal averaging).

The elevation of equation (1) to a vector equation makes no difference to the previous arguments in favor of S-matrices as the best choice for the sampling matrix A. Provided the noise in the instrument arises only from the signal detection system, and is independent of the numbers of sources and samples contributing to the composite signal, the use of S-matrices as the signal encoding scheme will lead to an improvement signal-to-noise ratio (equation (3), with N being the number of samples).

In the above example where the signals are regarded as FT-IR interferograms, the experimental data (the N interferograms $\vec{Y}_i$) are doubly encoded signals. To recover the spectra of the individual samples, we need to perform (i) an inverse Hadamard transform to recover the individual interferograms, followed by (ii) apodisation and inverse Fourier transforms to obtain the spectra.

This technique exhibits advantages arising from multiplexing and signal averaging, and, in addition, it has the important advantage that only one expensive spectrometer or other signal detection system is required to measure multiple signals. If the radiation sources are inexpensive, the performance can be improved by employing one source per sample, thus increasing the total signal arriving at the detector.

BRIEF DESCRIPTION OF THE DRAWINGS

The invention will be particularly described with reference to the accompanying drawings, in which.

DESCRIPTION OF PREFERRED EMBODIMENTS

Figure 1:
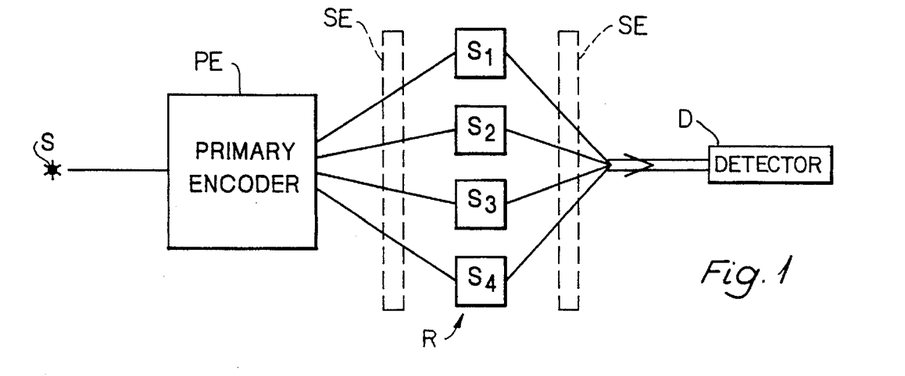
FIGS. 1–3 represent basic multiplexing design schemes for different kinds of spectroscopic and other signal analysis instrumentation.
Figure 2:
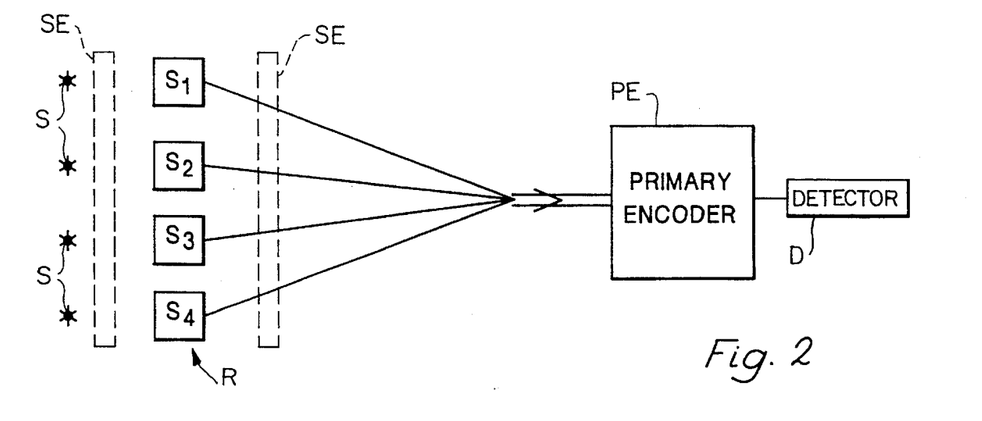
Figure 3:
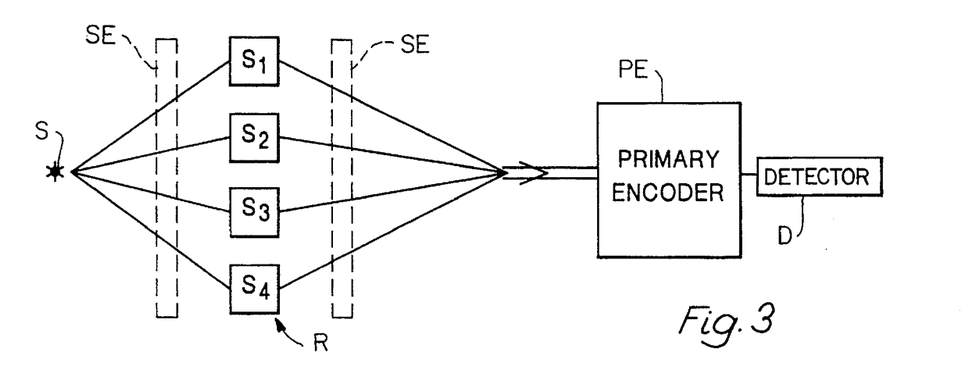
Figure 4A:
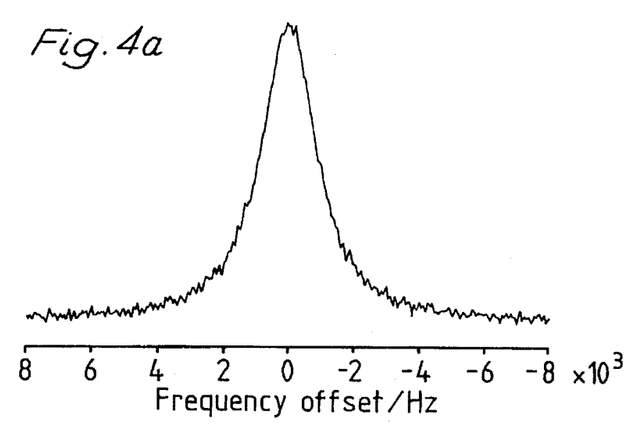
FIGS. 4a–d show four spectra composed of one or more Lorentzian lineshapes with Gaussian noise superimposed.
Figure 4B:
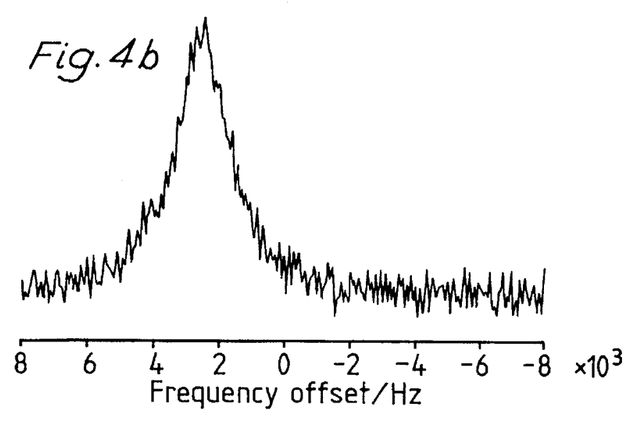
Figure 4C:
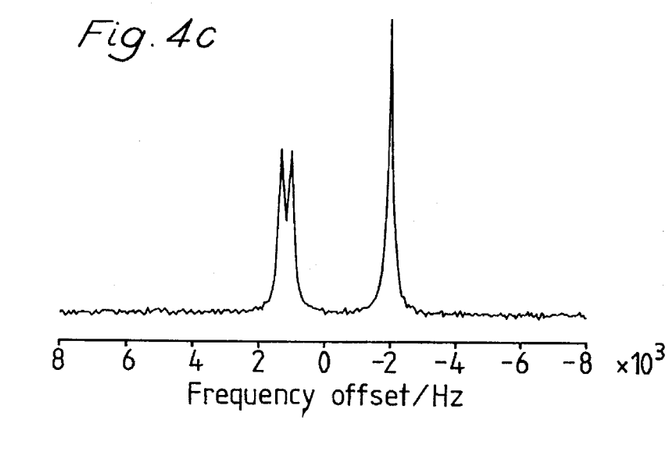
Figure 4D:
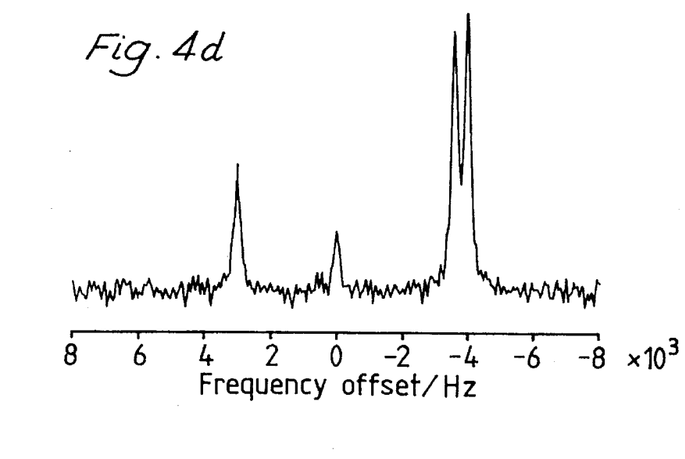
Figures 5A, 5B:
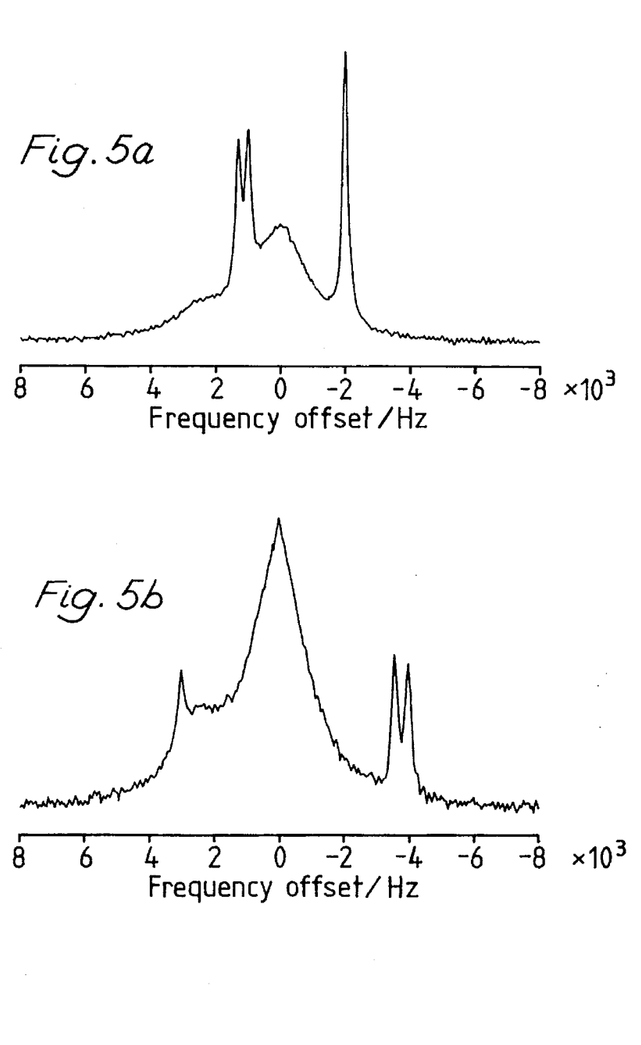
FIGS. 5a–g show composite shapes obtained by combining the four individual spectra (the Lorentzian lines, not the noise) and then adding noise with the same standard deviation as in FIGS. 4a through 4d.
Figure 5C:
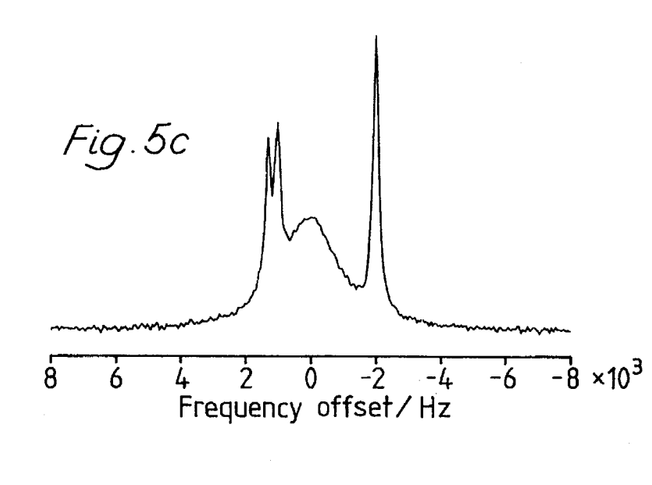
Figure 5D:
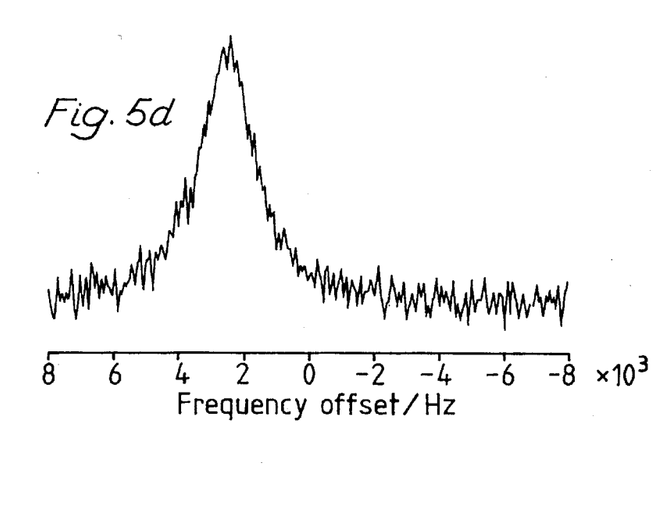
Figure 5E:
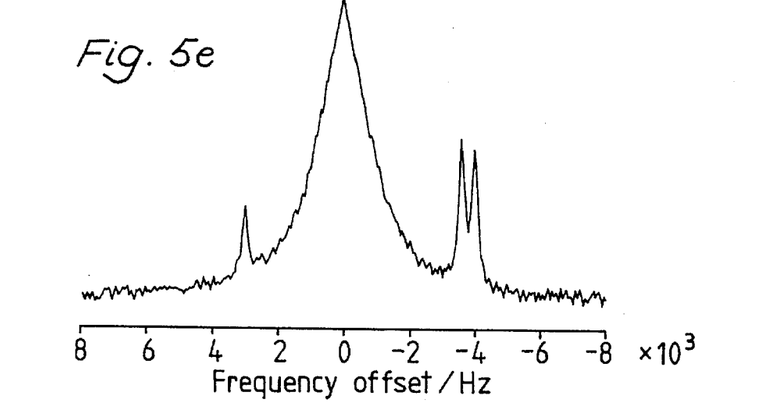
Figure 5F:
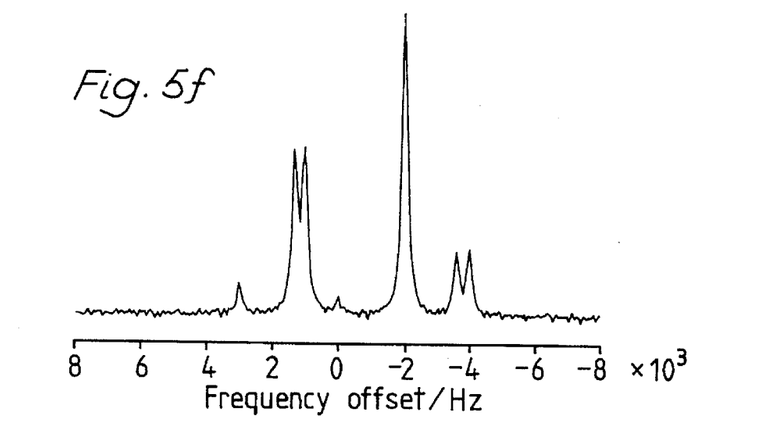
Figure 5G:
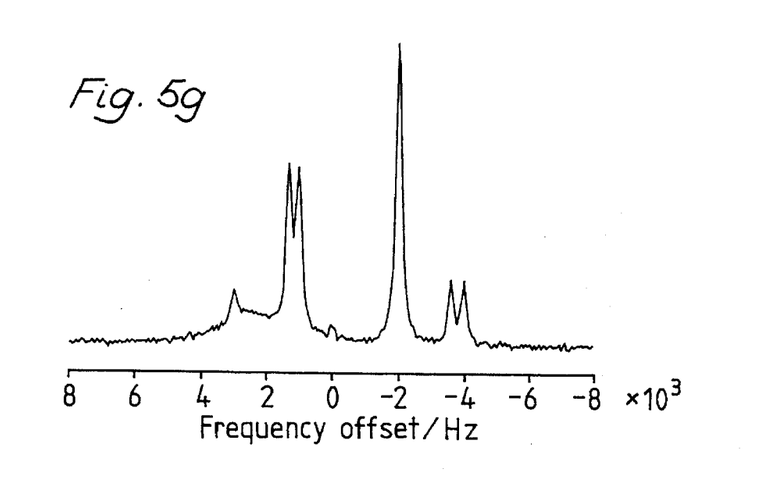
Figure 6A:
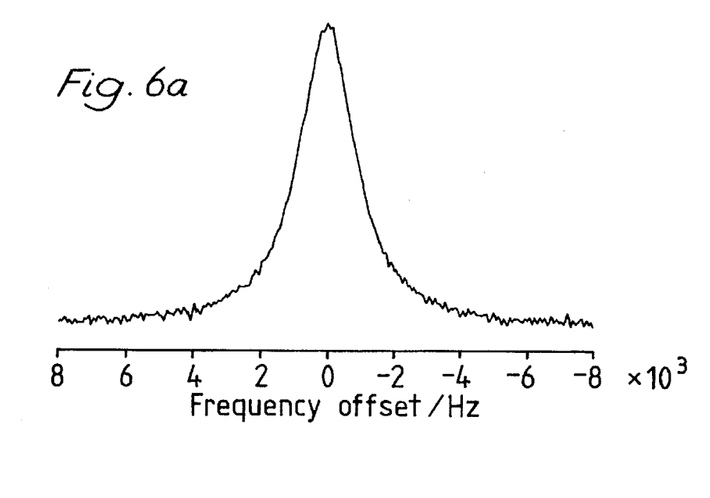
FIGS. 6a–d show demultiplexed spectra calculated in accordance with one embodiment of the invention.
Figure 6B:
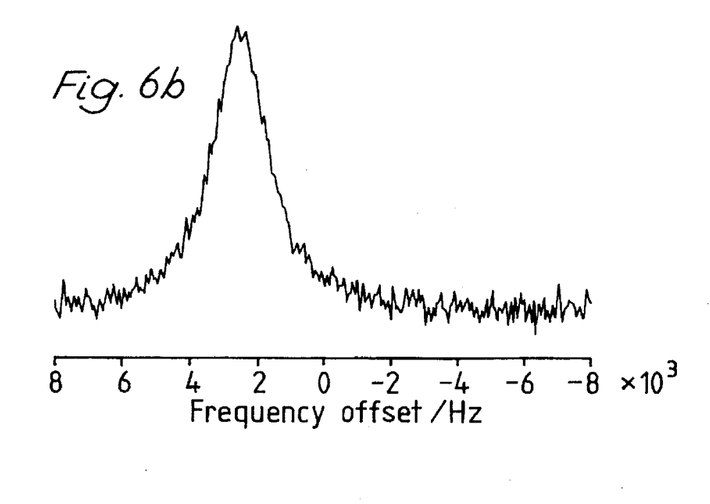
Figure 6C:
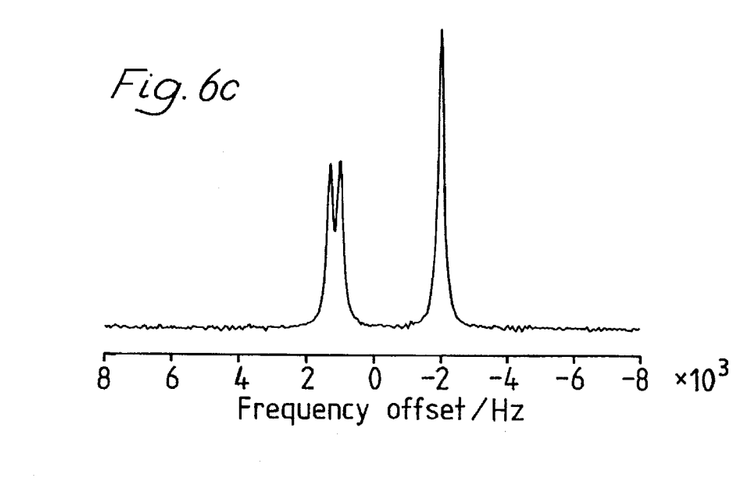
Figure 6D:
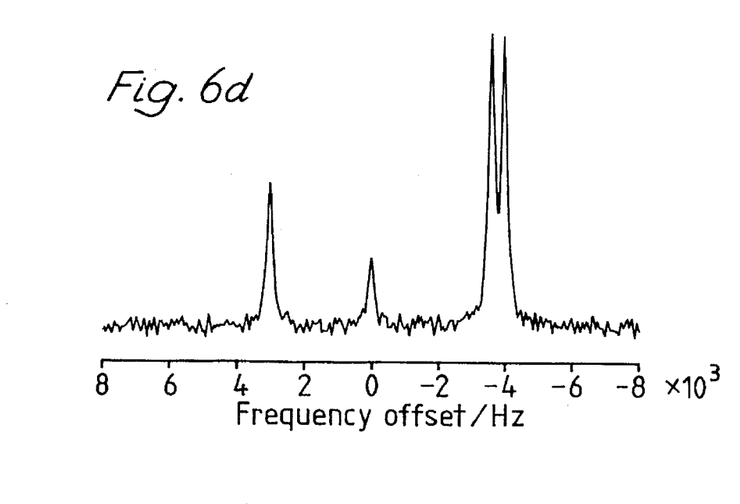

Some basic designs for multiplexing spectrometers are shown in FIGS. 1 to 3. All the schemes consist of one or more sources S, a primary encoder PE, a secondary encoder SE, an arbitrary number N of samples $S_i$ and a detector D which converts the signal to a digital record for analysis. In FIGS. 1 and 3 only one source is used. In optical systems this would be a lamp or laser but could equally be a microwave generator or other source.

Referring now to FIG. 1 of the drawings, the energy from a source S is passed through a primary encoder PE. The primary encoder acts as a wavelength sorting device. It may be a diffraction grating, a simple filter system or a Fourier transform device such as a Michelson interferometer. Alternatively, for example in Fourier transform dielectric spectroscopy or NMR, it may be a pulse generator. The general function of the primary encoder PE is to ensure that each wavelength arriving at the detector is encoded in some way, to make it distinguishable from all the other wavelengths that may arrive.

In FIGS. 2 and 3 the primary encoder is placed after the sampling region R; the total signal is then wavelength encoded after the radiation passes through the samples. In optical spectroscopy this means that some signal, already attenuated by absorption by the samples, acts as a source for the spectrometer.

In FIG. 2 multiple sources are used. This ensures that a larger signal energy will impinge on the detector. This configuration also has the advantage of improving the robustness of the system since the failure of a single source will not result in total signal loss but only loss, of signal from one sample.

A feature of all three configurations is the multiple sampling channels which are co-added to present a single signal to the detector. In general for optical systems fiber optics or light guides will be needed for at least part of the system, since the samples may be physically separated. Such devices are used throughout the system and transduction to an electric signal made at the detector stage.

The secondary encoder SE is the device by which the signals are encoded by the coefficients $A_{ij}$ in equation 1. It modulates the intensities of the signals in the separate sample channels as required. If S-matrix coefficients are used ($A_{ij}=0$ or 1), then the secondary encoder takes the form of a series of computer-controlled switches, which may be mechanical shutters or a bank of electro-optic switches such as an LC-OSA, for an optical system; or a series of electronic gates, if the signals are electrical in nature. Two alternative positions for the secondary encoder are shown in each Illustration.

FIGS. 1–3 represent basic multiplexing design schemes for different kinds of spectroscopic and other signal analysis instrumentation. In each case, multiple signals from several samples are encoded using successive rows of an S-matrix to regulate the opening and closing of the switches in the secondary encoder. One problem remains: it was stated in the Background of the Invention section that an S-matrix only exists when the matrix order N is of the form $4n-1$, for $n=1, 2, 3 \ldots$ How should we proceed when the number of samples does not satisfy this condition? The solution will be illustrated with reference to an experiment using four samples. The smallest suitable S-matrix has $N=7$. Equation (1) takes the form, $$\begin{bmatrix} \vec{Y}_1 \\ \vec{Y}_2 \\ \vec{Y}_3 \\ \vec{Y}_4 \\ \vec{Y}_5 \\ \vec{Y}_6 \\ \vec{Y}_7 \end{bmatrix} = \begin{bmatrix} 1 1 1 0 & 1 0 0 \\ 1 1 0 1 & 0 0 1 \\ 1 0 1 0 & 0 1 1 \\ 0 1 0 0 & 1 1 1 \\ 1 0 0 1 & 1 1 0 \\ 0 0 1 1 & 1 0 1 \\ 0 1 1 1 & 0 1 0 \end{bmatrix} \begin{bmatrix} \vec{X}_1 \\ \vec{X}_2 \\ \vec{X}_3 \\ \vec{X}_4 \\ \vec{X}_5 \\ \vec{X}_6 \\ \vec{X}_7 \end{bmatrix} \quad (5)$$

Since samples 5, 6 and 7 do not exist, the vectors $\vec{X}_5$, $\vec{X}_6$ and $\vec{X}_7$ are null vectors, or arrays of zeroes in the computer sense. At the experimental stage, we only need to employ the coefficients in the 7×4 submatrix on the left-hand side of A. That is, we perform seven separate experiments to measure seven composite signals $\vec{Y}_1 \ldots \vec{Y}_7$ using the seven rows of the submatrix as the schedule for controlling the four secondary encoder switches or shutters. Thus, the seven composite signals are composed from the four individual signals as follows:

$$\begin{aligned} \vec{Y}_1 &= \vec{X}_1 + \vec{X}_2 + \vec{X}_3 \\ \vec{Y}_2 &= \vec{X}_1 + \vec{X}_2 \phantom{+\vec{X}_3} + \vec{X}_4 \\ \vec{Y}_3 &= \vec{X}_1 \phantom{+\vec{X}_2} + \vec{X}_3 \\ \vec{Y}_4 &= \phantom{\vec{X}_1 +} \vec{X}_2 \\ \vec{Y}_5 &= \vec{X}_1 \phantom{+\vec{X}_2 + \vec{X}_3} + \vec{X}_4 \\ \vec{Y}_6 &= \phantom{\vec{X}_1 + \vec{X}_2 +} \vec{X}_3 + \vec{X}_4 \\ \vec{Y}_7 &= \phantom{\vec{X}_1} + \vec{X}_2 + \vec{X}_3 + \vec{X}_4 \end{aligned} \quad (6)$$

$$\begin{bmatrix} \vec{X}_1 \\ \vec{X}_2 \\ \vec{X}_3 \\ \vec{X}_4 \\ \vec{X}_5 \\ \vec{X}_6 \\ \vec{X}_7 \end{bmatrix} = \begin{bmatrix} 1/4 & 1/4 & 1/4 & -1/4 & 1/4 & -1/4 & -1/4 \\ 1/4 & 1/4 & -1/4 & 1/4 & -1/4 & -1/4 & 1/4 \\ 1/4 & -1/4 & 1/4 & -1/4 & -1/4 & 1/4 & 1/4 \\ -1/4 & 1/4 & -1/4 & -1/4 & 1/4 & 1/4 & 1/4 \\ 1/4 & -1/4 & -1/4 & 1/4 & 1/4 & 1/4 & -1/4 \\ -1/4 & -1/4 & 1/4 & 1/4 & 1/4 & -1/4 & 1/4 \\ -1/4 & 1/4 & 1/4 & 1/4 & -1/4 & 1/4 & -1/4 \end{bmatrix} \begin{bmatrix} \vec{Y}_1 \\ \vec{Y}_2 \\ \vec{Y}_3 \\ \vec{Y}_4 \\ \vec{Y}_5 \\ \vec{Y}_6 \\ \vec{Y}_7 \end{bmatrix} \quad (7)$$

Since we are only interested in $\vec{X}_1 \ldots \vec{X}_4$ we only need to employ the coefficients in the 4×7 submatrix at the top of the inverse matrix $A^{-1}$ in the calculation.

An important question is whether the performance of seven separate experiments on just four samples in this way is more efficient than doing four separate experiments on the individual samples. The answer, surprisingly, is yes, as will now be demonstrated.

Suppose first that we perform one scan to acquire each of the seven composite signals. The signal-to-noise enhancement (the multiplex advantage) is given by equation (3) with $N=7$, i.e. 1.512. Alternatively, we might perform four experiments on the individual samples with two scans per sample. The signal-to-noise enhancement obtained from signal averaging of two scans is $\sqrt{2}$, or 1.414. Comparing an enhancement of 1.512 in seven scans with one of 1.414 in eight scans, we see a small but definite advantage in favor of the multiplexing scheme.

Table 1 lists the expected signal-to-noise enhancements with sequential multiplexing sampling schemes, for an instrument with up to 15 sample channels. We see that for 3 or more samples, there is always an advantage in using a multiplexing scheme. In each case, the multiplex advantage is more than sufficient to offset any redundancy implied by the performance of more experiments than there are samples.

A numerical simulation suffices to demonstrate that the above ideas work in practice. FIGS. 4a–d show four spectra composed of one or more Lorentzian lineshapes with Gaussian noise superimposed. The exact nature of these spectra is irrelevant to the discussion, but it should be noted that the standard deviation of the noise in each data set was the same. The spectra are plotted with a normalized vertical scale so that the most intense peaks in each spectrum have the same height. FIGS. 5a–g show the seven composite shapes obtained by combining the four individual spectra (the Lorentzian lines, not the noise) according to equation (6), and then adding noise with the same standard deviation as in FIG. 4. Finally, FIGS. 6a–d show the demultiplexed spectra calculated according to equation (7). Comparing these with FIGS. 4a–d, an improvement (albeit small) in signal-to-noise ratio is evident in each case. The essential condition for obtaining this improvement is that the noise in the composite spectra is independent of the number of contributions.

The inverse Hadamard transform represented by equation (7) is a trivial mathematical process, requiring negligible computer time, because the number of samples (≦the order of the matrix) will not generally be large.

TABLE 1

| Number of channels | Order of S matrix | Signal/noise enhancement for sequential sampling | | Signal/noise enhancement for S matrix sampling | |
| --- | --- | --- | --- | --- | --- |
| 2  | 3  | 1.414 | (4)  | 1.06  | (3)  |
| 3  | 3  | 1.0   | (3)  | 1.06  | (3)  |
| 4  | 7  | 1.414 | (8)  | 1.512 | (7)  |
| 5  | 7  | 1.414 | (10) | 1.512 | (7)  |
| 6  | 7  | 1.414 | (12) | 1.512 | (7)  |
| 7  | 7  | 1.414 | (14) | 1.512 | (7)  |
| 8  | 11 | 1.732 | (24) | 1.809 | (11) |
| 9  | 11 | 1.732 | (27) | 1.809 | (11) |
| 10 | 11 | 1.732 | (30) | 1.809 | (11) |
| 11 | 11 | 1.732 | (33) | 1.809 | (11) |
| 12 | 15 | 2.0   | (48) | 2.066 | (15) |
| 13 | 15 | 2.0   | (52) | 2.066 | (15) |
| 14 | 15 | 2.0   | (56) | 2.066 | (15) |
| 15 | 15 | 2.0   | (60) | 2.066 | (15) |

The figures in brackets represent the total number of scans required to achieve the signal to noise enhancement shown in the column.

We claim:

1. A spectrometer for simultaneous examination of a plurality of remotely distributed samples comprising:

radiation source means for establishing a radiation path;

one only detector in said radiation path for detecting radiation emanating from said radiation source means;

radiation path between said sample receiving means and said one only detector; and sample receiving means disposed between said radiation source and said one only detector for holding said plurality of remotely distributed samples in said radiation path;

primary encoder means, disposed in said radiation path between said radiation source means and said one only detector, for encoding through a complete spectrum one of a wavelength and a frequency of radiation in said radiation path; and secondary encoder means, disposed in said radiation path between said radiation source means and said one only detector, for selectively modulating an intensity of radiation directed at each one of said plurality of remotely distributed samples in said radiation path by a predetermined amount, thereby permitting said modulated radiation to be multiplexed onto said one only detector.

2. The spectrometer of claim 1, wherein:

said secondary encoder means and said primary encoder means are disposed between said sample receiving means and said radiation source means.

3. The spectrometer of claim 1, wherein:

said secondary encoder means is disposed in said radiation path between said sample receiving means and said one only detector; and said primary encoder means is disposed in said radiation path between said sample receiving means and said radiation source means.

4. The spectrometer of claim 1, wherein:

said secondary encoder means is disposed in said radiation path between said sample receiving means and said radiation source means; and said primary encoder means is disposed in said radiation path between said sample receiving means and said one only detector.

5. The spectrometer of claim 1, wherein:

said secondary encoder means and said primary encoder means are disposed in said radiation path between said sample receiving means and said one only detector.

6. The spectrometer of claim 1, wherein:

said radiation source means comprises a plurality of radiation sources emanating a plurality of radiation paths respectively for said plurality of remotely distributed samples;

whereby said radiation source means creates a high intensity at said one only detector.

7. The spectrometer of claim 6, wherein:

said secondary encoder means is disposed in said plurality of radiation paths between said sample receiving means and said radiation source means; and said primary encoder is disposed in said plurality of radiation paths between said sample receiving means and said one only detector.

8. The spectrometer of claim 6, wherein:

said secondary encoder means and said primary encoder means are disposed in said plurality of radiation paths between said sample receiving means and said one only detector.

9. The spectrometer of claim 1, wherein:

said primary encoding means includes a wavelength sorting device.

10. The spectrometer of claim 1, wherein:

said primary encoding means includes a diffraction grating.

11. The spectrometer of claim 1, wherein:

said primary encoding means includes a Michelson interferometer.

12. The spectrometer of claim 1, wherein:

said primary encoding means includes a pulse generator.

13. The spectrometer of claim 1, wherein:

said secondary encoder means comprises means to modulate an intensity of radiation of a plurality of signals $X_j$; and a plurality of observations $Y_j$ are defined by a matrix:

$$\begin{bmatrix} Y_1 \\ Y_2 \\ \cdot \\ \cdot \\ \cdot \\ Y_N \end{bmatrix} = \begin{bmatrix} A_{11} & A_{12} & \ldots & A_{1N} \\ A_{21} & A_{22} & \ldots & A_{2N} \\ \cdot & & & \\ \cdot & & & \\ \cdot & & & \\ A_{N1} & \ldots & \ldots & A_{NN} \end{bmatrix} \begin{bmatrix} X_1 \\ X_2 \\ \cdot \\ \cdot \\ \cdot \\ X_N \end{bmatrix}$$

wherein coefficients $A_{ij}$ have a value of 0 or 1.

14. The spectrometer of claim 1, wherein:

said primary encoder comprises a Michelson interferometer.

15. The spectrometer of claim 13, further comprising:

nuclear spin detection means for detecting a precession and dephasing of nuclear spins within each of said plurality of remotely distributed samples.

16. The spectrometer of claim 13, wherein:

said secondary encoder means includes a plurality of switches.

17. The spectrometer of claim 16, wherein:

said plurality of switches comprise a bank of mechanical shutters.

18. The spectrometer of claim 16, wherein:

said plurality of switches comprise a bank of electro-optic switches.

19. The spectrometer of claim 16, wherein:

said plurality of switches comprise a plurality of electronic gates.

20. A spectrometer for a simultaneous examination of a plurality of remotely distributed samples, comprising:

a radiation source for producing radiation and establishing a radiation path;

one only detector for detecting said radiation at an end of said radiation path;

a sample receiver for holding said plurality of remotely distributed samples and for positioning an individual sample of said plurality of remotely distributed samples in said radiation path, said sample receiver being positioned between said radiation source and said one only detector;

a primary encoder in said radiation path for encoding through a complete spectrum one of a wavelength and frequency radiation from said radiation source, said primary encoder being positioned between said sample receiver and said radiation source;

a secondary encoder for selectively modulating an intensity of radiation directed at each one of said plurality of remotely distributed samples in said radiation path by a predetermined amount and being positioned between said sample receiver and said primary encoder, thereby permitting said modulated radiation to be multiplexed onto said one only detector.

21. The spectrometer of claim 20, wherein:

said radiation source comprises a plurality of radiation sources emanating a plurality of radiation paths respectively for said plurality of remotely distributed samples;

whereby said radiation source creates a high intensity at said one only detector.

22. A spectrometer for a simultaneous examination of a plurality of remotely distributed samples, comprising:

a radiation source for producing radiation and establishing a radiation path;

one only detector for detecting said radiation at an end of said radiation path;

a sample receiver for holding said plurality of remotely distributed samples and for positioning an individual sample of said plurality of remotely distributed samples in said radiation path, said sample receiver being positioned between said radiation source and said one only detector;

a primary encoder in said radiation path for encoding through a complete spectrum one of a wavelength and a frequency of radiation from said radiation source, said primary encoder being positioned between said sample receiver and said one only detector;

a secondary encoder for selectively modulating an intensity of radiation directed at each of said plurality of remotely distributed samples in said radiation path by a predetermined amount and being positioned between said sample receiver and said radiation source , thereby permitting said modulated radiation to be multiplexed onto said one only detector.

23. The spectrometer of claim 22, wherein:

said radiation source comprises a plurality of radiation sources emanating a plurality of radiation paths respectively for said plurality of remotely distributed samples;

whereby said radiation source creates a high intensity at said one only detector.

24. A spectrometer for a simultaneous examination of a plurality of remotely distributed samples, comprising:

a radiation source for producing radiation and establishing a radiation path;

one only detector for detecting said radiation at an end of said radiation path;

a sample receiver for holding said plurality of remotely distributed samples and for positioning an individual sample of said plurality of remotely distributed samples in said radiation path, said sample receiver being positioned between said radiation source and said one only detector;

a primary encoder in said radiation path for encoding through a complete spectrum one of a wavelength and a frequency of radiation from said radiation source, said primary encoder being positioned between said sample receiver and said radiation source;

a secondary encoder for selectively modulating an intensity of radiation directed at each one of said plurality of remotely distributed samples in said radiation path by a predetermined amount and being positioned between said sample receiver and said one only detector, thereby permitting said modulated radiation to be multiplexed onto said one only detector.

25. The spectrometer of claim 24, wherein:

said radiation source comprises a plurality of radiation sources emanating a plurality of radiation paths respectively for said plurality of remotely distributed samples;

whereby said radiation source creates a high intensity at said one only detector.

26. A spectrometer for a simultaneous examination of a plurality of remotely distributed samples, comprising:

a radiation source for producing radiation and establishing a radiation path;

one only detector for detecting said radiation at an end of said radiation path;

a sample receiver for holding said plurality of remotely distributed samples and for positioning an individual sample of said plurality of remotely distributed samples in said radiation path, said sample receiver being positioned between said radiation source and said one only detector;

a primary encoder in said radiation path for encoding through a complete spectrum one of a wavelength and a frequency of radiation from said radiation source, said primary encoder being positioned between said sample receiver and said one only detector;

a secondary encoder for selectively modulating an intensity of radiation directed at each one of said plurality of remotely distributed samples in said radiation path by a predetermined amount and being positioned between said sample receiver and said primary encoder, thereby permitting said modulated radiation to be multiplexed onto said one only detector.

27. The spectrometer of claim 26, wherein:

said radiation source comprises a plurality of radiation sources emanating a plurality of radiation paths respectively for said plurality of remotely distributed samples;

whereby said radiation source creates a high intensity at said one only detector.

* * * * *